United States Patent [19]

Chang

[11] Patent Number: 4,915,990
[45] Date of Patent: Apr. 10, 1990

[54] METHOD OF, AND ELASTOMERIC COMPOSITION FOR, PROTECTING A SUBSTRATE

[75] Inventor: Rong J. Chang, Fremont, Calif.

[73] Assignee: Raychem Corporation, Menlo Park, Calif.

[21] Appl. No.: 160,228

[22] Filed: Feb. 25, 1988

Related U.S. Application Data

[63] Continuation of Ser. No. 20,633, Mar. 2, 1987, abandoned.

[51] Int. Cl.$^4$ ................ F16L 11/00; B32B 31/00
[52] U.S. Cl. .................... 428/34.9; 156/85; 156/86; 138/177; 174/DIG. 8; 264/230; 264/342 R
[58] Field of Search ............ 428/36, 34.9, 35.1, 428/913; 156/85, 86; 264/230, 342 R; 138/177; 174/DIG. 8

[56] References Cited

U.S. PATENT DOCUMENTS

| | | | |
|---|---|---|---|
| Re. 28,688 | 1/1976 | Cook | 264/230 |
| 3,086,242 | 4/1963 | Cook | 156/86 |
| 3,297,819 | 1/1967 | Wetmore | 174/DIG. 8 |
| 3,455,336 | 7/1969 | Ellis | 138/156 |
| 3,515,798 | 6/1970 | Sievert | 174/135 |
| 3,878,320 | 4/1975 | Mixon Jr. et al. | 174/84 R |
| 4,070,746 | 1/1978 | Evans et al. | 156/344 |
| 4,485,198 | 11/1984 | Hamed | 525/284 |
| 4,506,430 | 3/1985 | Guzay | 29/450 |

FOREIGN PATENT DOCUMENTS 0210807 4/1987 European Pat. Off. .
2099638 6/1985 United Kingdom .

Primary Examiner—James Seidleck
Attorney, Agent, or Firm—Edith A. Rice; Herbert G. Burkard

[57] ABSTRACT

A cable splice is environmentally sealed by positioning around it a stretched sheet of a curable elastomeric composition, allowing the sheet to relax into engagement, and then curing the composition. The composition may comprise a polychloroprene elastomer and a polyepoxide and optionally a curing agent, the polyepoxide present in sufficient quantity that it can act as a plasticizer.

32 Claims, 9 Drawing Sheets

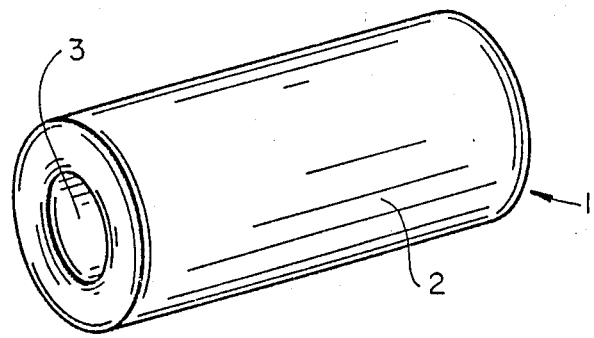
FIG_1A
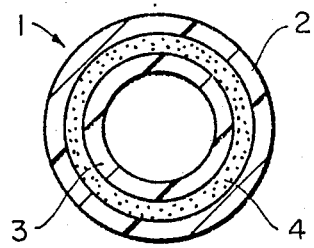
FIG_1B
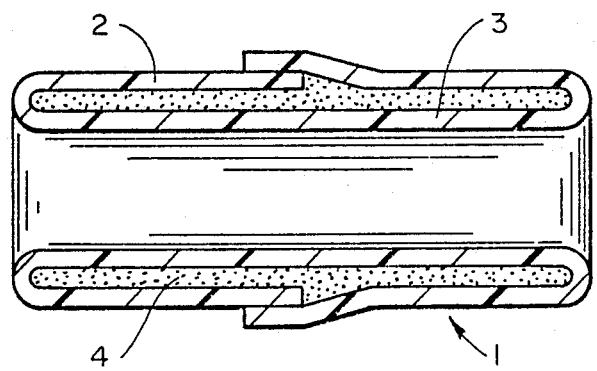
FIG_1C

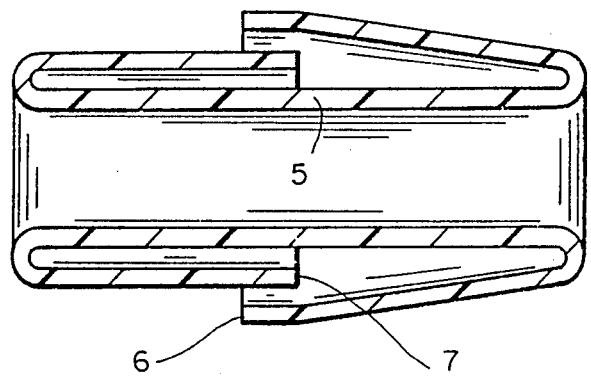
FIG_2
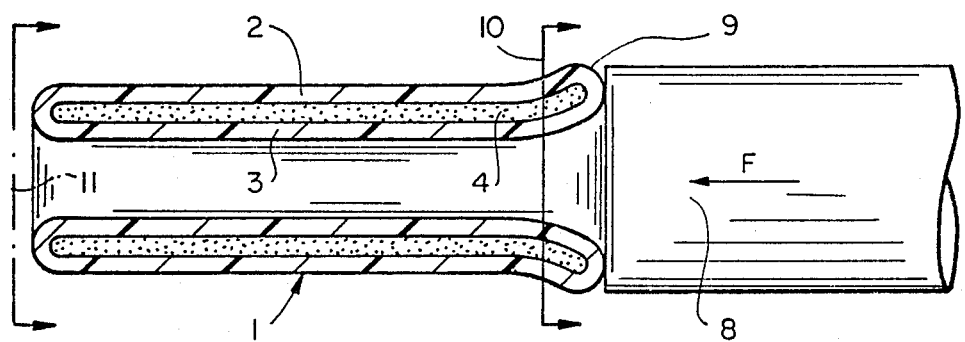
FIG_3A
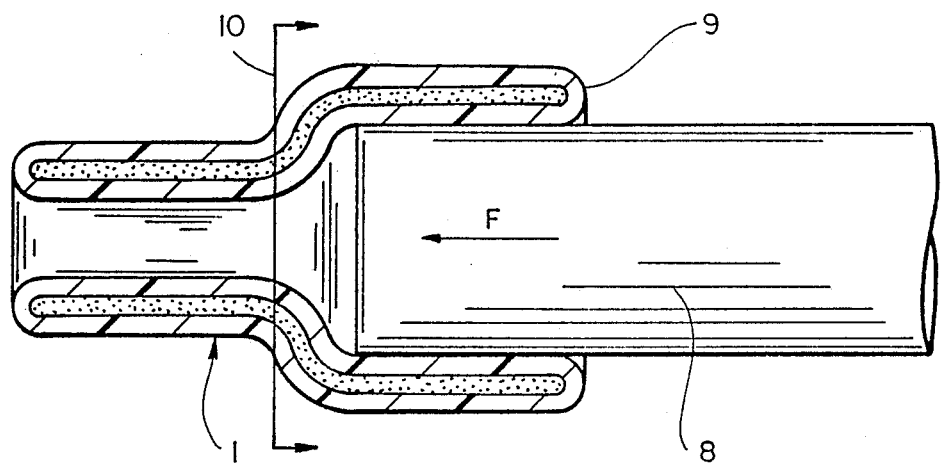
FIG_3B

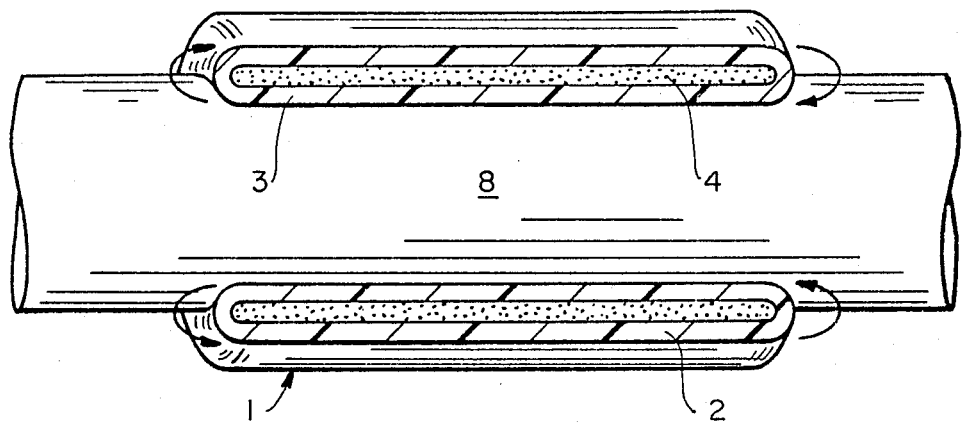
FIG_3C
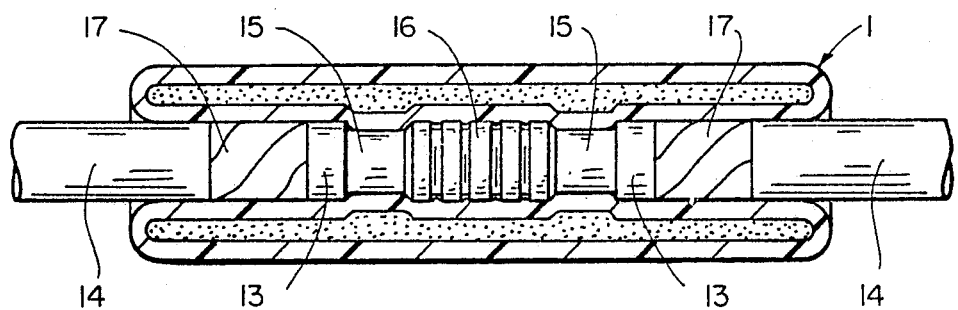
FIG_4

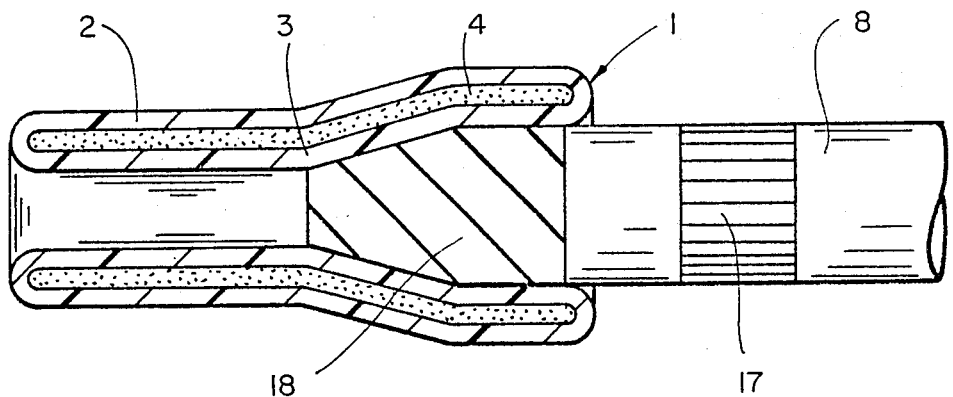
FIG_5A
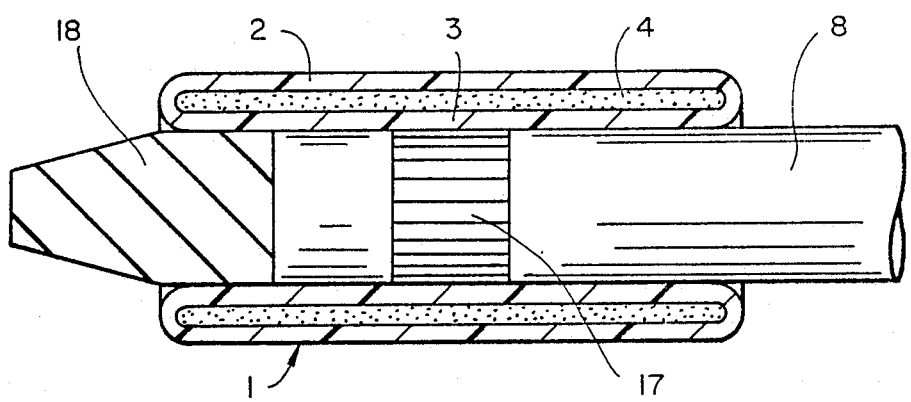
FIG_5B

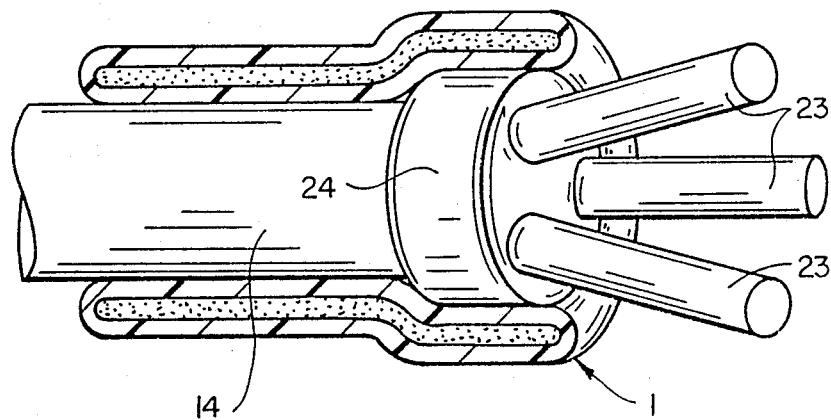
FIG_6
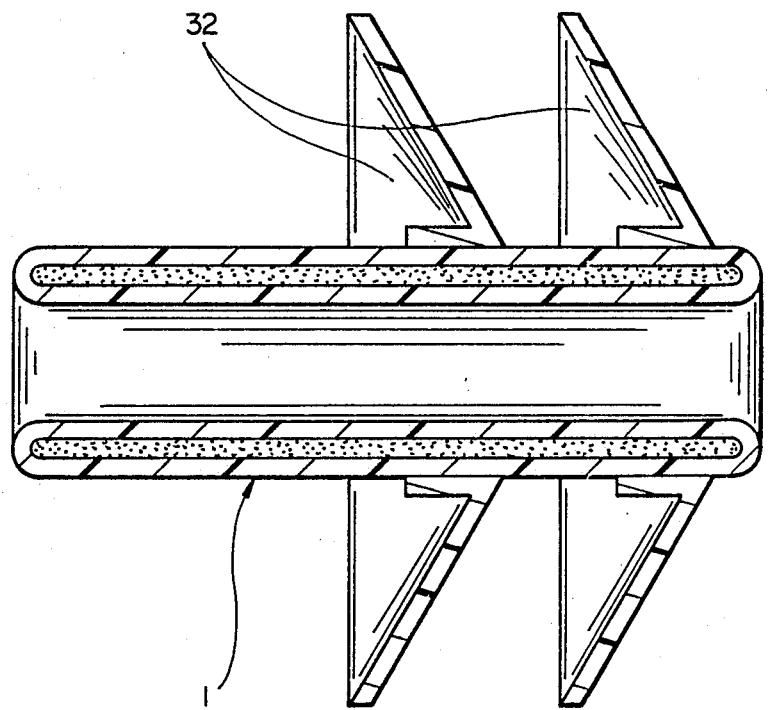
FIG_8

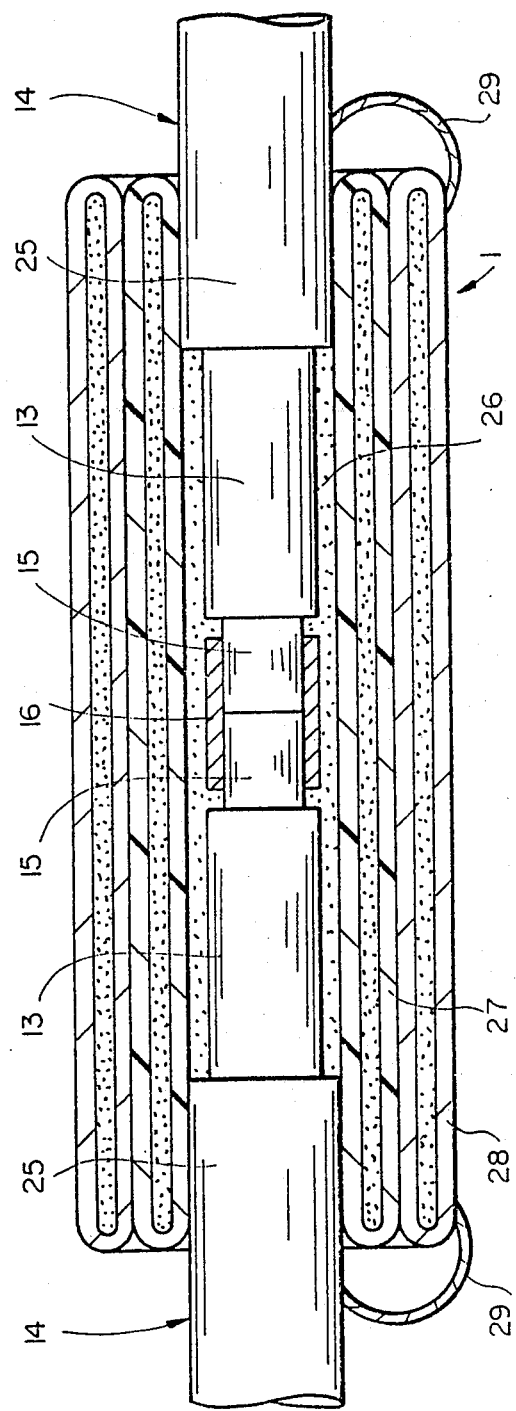

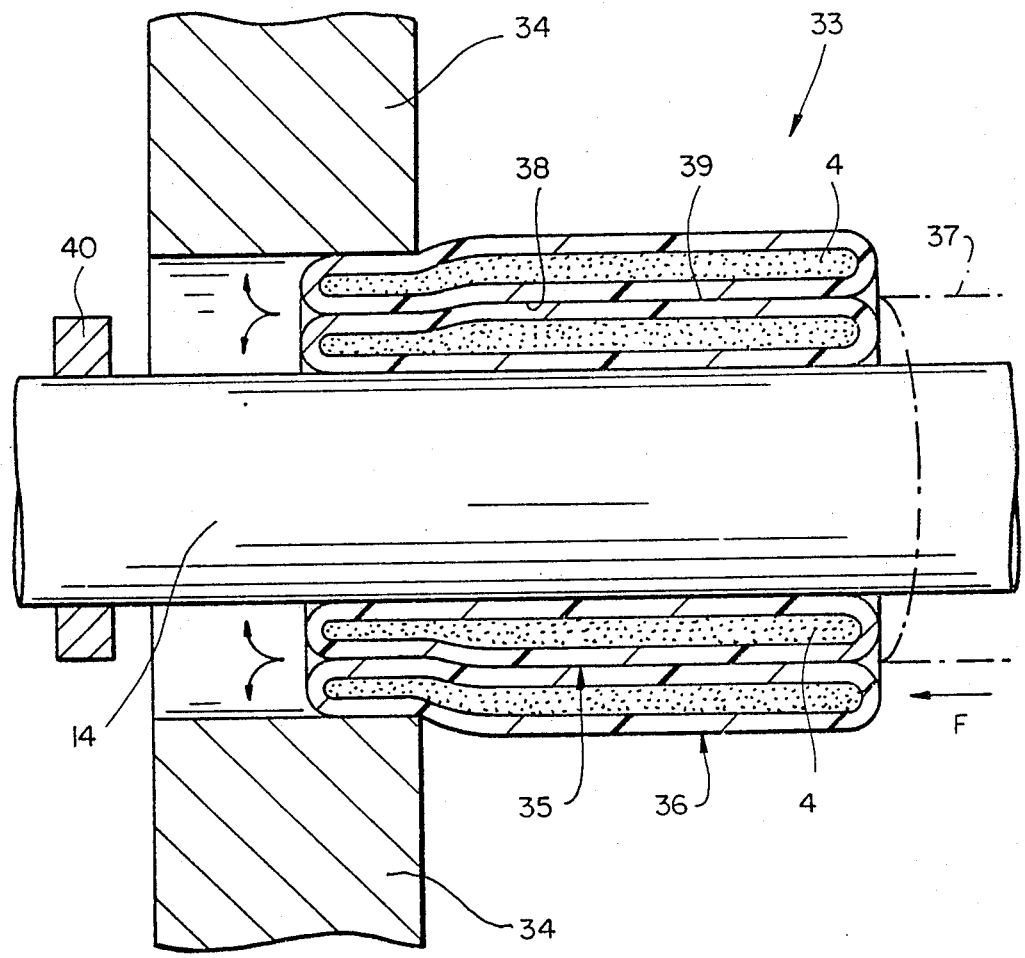
FIG_9

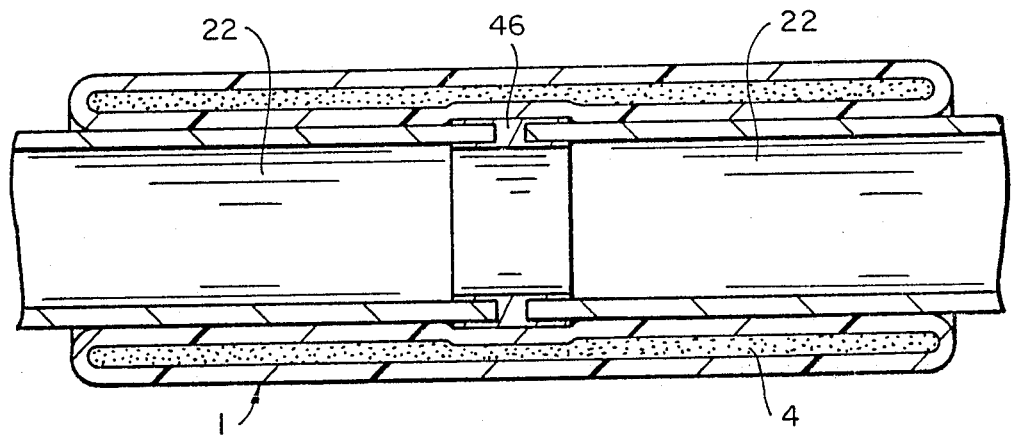
FIG_10
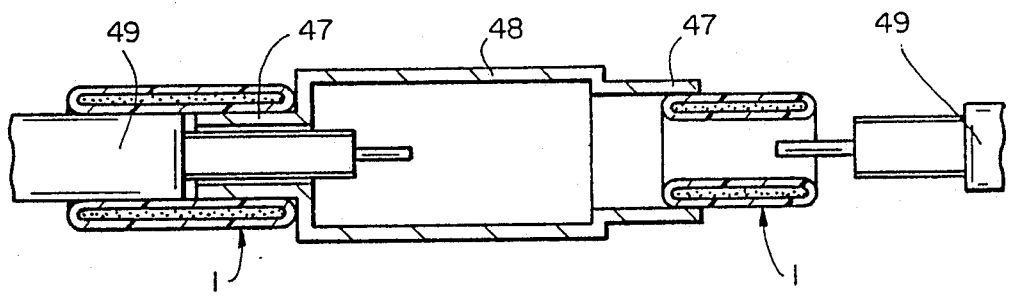
FIG_11

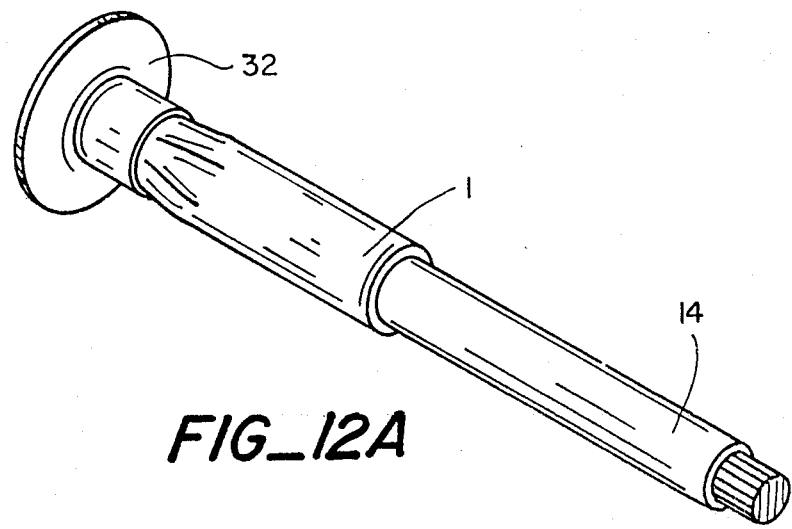
FIG_12A
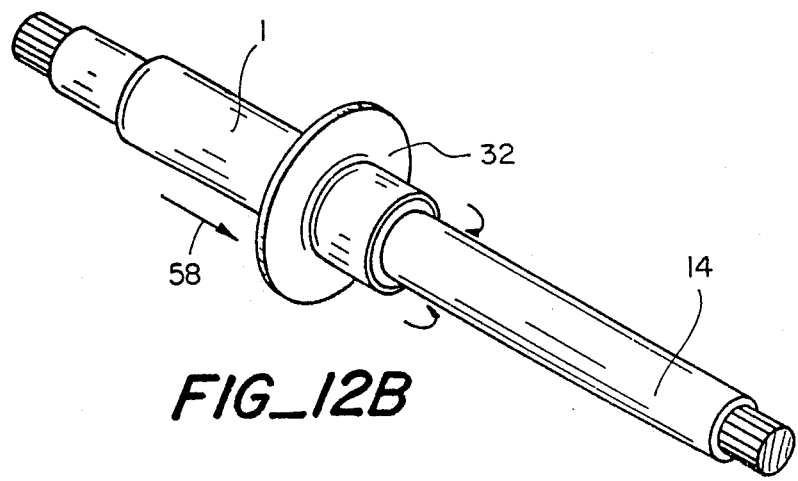
FIG_12B

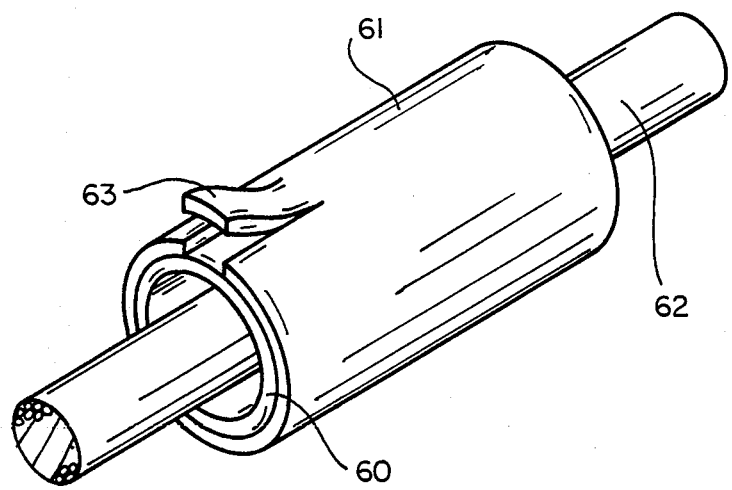
FIG_13
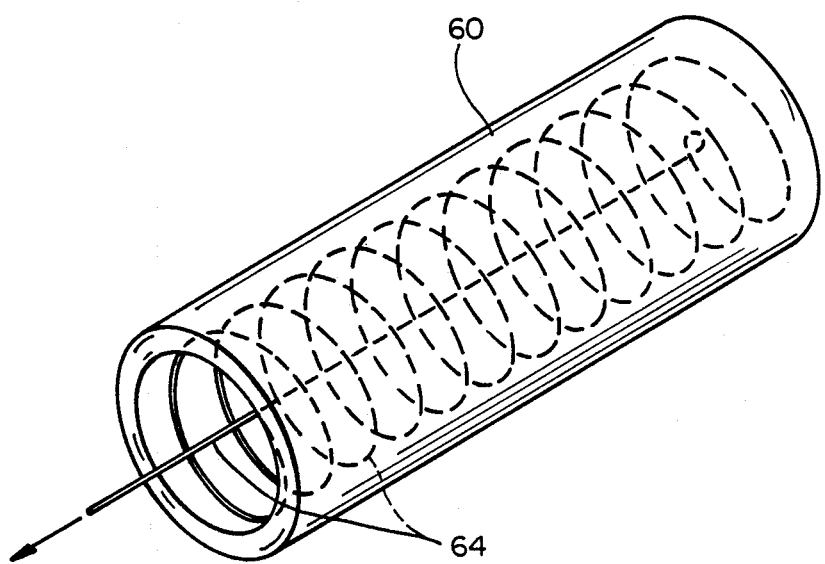
FIG_14

METHOD OF, AND ELASTOMERIC COMPOSITION FOR, PROTECTING A SUBSTRATE

This application is a continuation of application Ser. No. 020,633 filed Mar. 2, 1987, now abandoned.

This invention relates to a method of protecting a substrate, particularly one suitable for enclosure of a substrate for environmental protection, including electrical protection, and joining or mechanical holding of substrates such as cables and pipes. The method employs an elastomeric composition having improved physical properties, particularly tear strength and/or rigidity and/or surface hardness, and it may have the configuration of a double-walled tube, or be otherwise hollow.

Whilst the invention is not limited to any particular field of use, it finds particular applicability in the cable accessories and pipeline industries for protection and joining. Thus, the invention will be illustrated with reference to such uses.

It is often necessary to provide around a cable or pipe a covering to prevent environmental damage such as corrosion or to provide electrical insulation. The covering may comprise a simple adhesive tape-wrapping which, while applicable to a wide variety of sizes of substrates, requires skill for proper use, and even with skill is not long-lasting nor able to resist tough environments. What is required is generally a tight fit over the substrate, an ability to be installed over substrates of various sizes, a certain life-time in service (in the cable accessories field often comparable to that of the cable, say thirty years) and some functional performance such as electrical insulation or water impermeability.

The poor sealing achieved with tapes has been overcome by the use of dimensionally-recoverable, generally heat-shrinkable, articles such as sleeves for example those disclosed in U.S. Pat. Nos. 3,086,242 to Cook et al., 3,279,819 to Wetmore and 3,455,336 to Ellis. Such articles, which are supplied in an expanded state, relax on heating. Thus a sleeve for example is easily positioned around a portion of a cable to be sealed, and is then heated causing it tightly to engage the cable.

Cold-shrinkable products have also been proposed. An elastomeric sleeve is held in an expanded configuration by means of a restraint. The expanded sleeve must then be separated from the restraint in such a way to permit it to recover towards its unexpanded configuration and into engagement with the cable or other substrate. Articles of this type are disclosed in U.S. Pat. Nos. 3,515,798 to Sievert, 4,070,746 to Evans et al., and 4,506,430 to Guzay.

Another approach is to support the centre portion of an elastomeric sleeve in a stretched condition and roll the ends of the sleeve over the central support. In use the support and rolled-up sleeve are positioned over the substrate. Then the ends of the sleeve are unrolled bringing them into contact with the substrate. Such articles are disclosed in U.S. Pat. No. 3,878,320 to Mixon Jr. et al., and G.B. No. 2,099,638 to Pirelli. Again the article is maintained in an expanded configuration which can lead to tension-set. Also, the installed product may not have the requisite hardness, rigidity or tear-strength since a reasonably low modulus material will be required if installation is not to be impossible.

An elastomeric article in the form of a double walled tube may be used to enclose a substrate, as is disclosed in EP-A-No. 0209399 (Raychem), the disclosure of which is incorporated herein by reference.

That prior specification discloses a double-walled tube having a friction-reducing means between the two walls of the double wall. The tube can be revolved along a substrate by relative sliding motion between the two walls of the double wall, substantially without relative sliding motion between a wall adjacent the substrate and the substrate. This revolving action may cause the walls to stretch, and thus the tube can be installed over substrates of larger dimension than its relaxed dimension, resulting in tight engagement.

We have now discovered that the use of a curable elastomeric composition provides particular advantages in connection with double-walled tubes and other articles. In particular, we have noticed ease of installation, and permanency and strength of the installed product.

Thus the invention provides a method of environmentally protecting a substrate, which comprises:
(i) providing an article comprising sheet, the sheet
  (a) having when relaxed an elongation of at least 5%, preferably at least 15%, more preferably at least 50%, especially at least 100%,
  (b) having a tear strength of at least 3 Kg per linear cm, preferably at least 5 Kg per linear cm, more preferably at least 15 Kg per linear cm,
  (c) having a modulus of $M_{100}$ of 1.4–17.6, preferably 2.0–10.6 Kg per sq. cm,
  (d) comprising a curable composition which comprises an elastomeric component and a curable component dispersed therein;
(ii) stretching the sheet
(iii) positioning the article adjacent the substrate;
(iv) causing or allowing the sheet to relax, and thus to engage the substrate; and
(v) causing the composition to cure after step (iv), such that the sheet then has
  (a) a tear strength of at least 5 Kg per linear cm, preferably at least 7.5 Kg per linear cm, especially at least 10 Kg per linear cm,
  (b) an increased modulus $M_{100}$, said increased modulus being at least 3.5, preferably 4.2, more preferably 5.6 Kg per sq. cm.

The invention also provides an article for environmentally protecting a substrate, which comprises an elastomeric sheet:
(a) having when relaxed an elongation of at least 5%, preferably at least 15%, more preferably at least 100%,
(b) having a tear strength of at least 3 Kg per linear cm, preferably at least 5 Kg per linear cm, more preferably at least 15 Kg per linear cm,
(c) having a modulus, $M_{100}$ of 1.4–17.6, preferably 2.0–10.6 Kg per sq. cm,
(d) comprising a curable composition which comprises an elastomeric composition and a curable component dispersed therein,
the article being capable of being positioned adjacent the substrate with the sheet in a stretched configuration, such that on its relaxation the sheet engages the substrate, the sheet after curing of the composition:
(a) having a tear strength of at least 5 Kg per linear cm, preferably at least 7.5 Kg per linear cm, especially at least 10 Kg per linear cm,
(b) having an increased modulus, $M_{100}$, said increased modulus being at least 3.5, preferably 4.2, more preferably 5.6 Kg per linear cm.

The invention further provides a chemical composition, which (a) comprises
 (i) polychloroprene having a molecular weight greater than $4 \times 10^4$;
 (ii) a curable polyepoxide dispersed in the polychloroprene and present in such quantity that it acts as plasticizer for the composition; and
 (iii) from 0–5% by weight based on the weight of the composition of a first curing agent for the polychloroprene and/or the polyepoxide;
(b) has a Mooney viscosity at 100° C. of from 10–60;
(c) is substantially stable at room temperature; and
(d) is capable of being cured by heat and/or by irradiation such that it has a modulus, $M_{100}$ of 1.4–17.6 Kg per sq. cm.

The chemical composition of the invention may be formed, particularly by extrusion or moulding (for example compression, transfer or injection moulding) into a shaped article.

In general a variety of articles may be provided suitable for environmental protection (including electrical insulation) especially in the cable accessories and pipeline industries. Such articles may comprise tubular and wrap-around sleeves, tapes and hollow moulded parts.

The elastomeric sheet comprises a curable composition which comprises an elastomeric component and a curable component dispersed therein. A first cure may occur which provides properties, for example tear strength and a satisfactorily low modulus which allow a suitable shaped article to be made and installed. Thus, the article can be installed on a substrate, such as a cable, by stretching the article, positioning the article with respect to the substrate as appropriate, and then allowing the article to relax into engagement with the substrate. Because of the satisfactory tear resistance after the first cure, this installation can be carried out with little risk of damage to the article. Once the article has been thus installed, it can (but need not) be further cured, to improve its split sensitivity, tear strength, abrasion resistance, or other property of interest. Thus, an elastomeric article may if desired be effectively transformed into a more rigid article of higher modulus. A high modulus after installation need not be a disadvantage, and will often be desirable.

The curable composition thus preferably comprises an elastomer and a curable component, at least one of which is at least partially cured by a first curing agent within the composition. The curable component initially acts as a plasticizer, and the second cure (i.e. after installation of the article) comprises curing of the curable plasticizer. Further curing of the elastomer may also occur at this stage and/or some copolymerization between elastomer and plasticizer may occur. This second cure may be brought about by spraying or otherwise coating a surface of the article with a second curing agent optionally in a suitable solvent.

A preferred elastomer comprises polychloroprene, for example Neoprene WD and/or Neoprene WK (trademarks), a preferred blend being 75 parts by weight Neoprene WD and 25 parts by weight Neoprene WK.

A preferred curable component (particularly for polychloroprene) comprises a polyepoxide for example a liquid epoxy resin, an example being Epon 828 (trademark). The curable component is preferably present in such quantity that it can act as a plasticizer, and I prefer that it be present as 5–90, more preferably 10–80, especially 15–60, particularly 20–40 parts by weight based on the weight of the elastomer.

The curable composition will, in general, include a first curing agent that causes the at least partial cure of the elastomer and/or curable component, but leaves the overall composition only partly cured. A preferred first curing agent comprises trimethylthio-urea, preferably present in an amount of 1.5–3, especially about 2.2 parts by weight per 100 parts by weight of the elastomer. The first curing agent is preferably dispersed in the elastomer.

The composition may contain various other components such as a processing aids (in addition to the curing component that functions as a plasticizer), a flame retardant, heat stabilizer, and filler or extender, etc.

A second curing agent is used to cure the composition after installation. It is preferred that the second curing agent cures primarily the curable component, but it may also or instead cure the elastomer, or it may cause copolymerization. A preferred second curing agent comprises a polyamide (in the case of a curable component comprising an epoxy resin), for example a Versamid (trademark) or Capcure (trademark). It may be applied to one or both sides of the elastomeric sheet.

The following examples illustrate various compositions. Modulus is given as $M_{100}$ in Kg per sq cm, and tear strength is given as Kg per linear cm according to a trouser tear test as described in Science and Technology of Rubber, Ed F. N. Eirich, on page 47. Each composition was cured at 185° C. to 90% as determined by a Monsanto Rheometer. Curing times will, in general, be between 10 and 40 minutes. The curing agent was trimethylthiourea.

| | Parts by Weight | | | | | |
|---|---|---|---|---|---|---|
| Example | Neoprene Elastomer | Epoxy Resin | Non-Reactive Plasticizer | Filler | 1st Curing Agent | $M_{100}$ | Tear Strength |
| 1 | 100 | 0 | 85 | | 2.2 | 6.9 | 6.6 |
| 2 | 100 | 20 | 65 | | 2.2 | 5.6 | 13.4 |
| 3 | 100 | 40 | 45 | | 2.2 | 10.3 | 22.3 |
| 4 | 100 | 80 | 5 | | 2.2 | 18.5 | 30.1 |

It can be seen that a reasonably low modulus can be retained, with satisfactorily high tear strength. In particular, it can be seen that a best compromise may be expected with from 20–40 parts of the reactive epoxy for 100 parts by weight of elastomer. It may be noted that the total amount of plasticizer was constant to make a fair comparison.

The effect of three different first curing agents and electron beam irradiation for the neoprene elastomer was investigated in Examples 5–8. In each of these examples, the composition was as Example 4 above, except for the different curing agent. It is believed that, using the curing agents specified below, the neoprene was selectively cured, and the epoxy remained reactive. The table below gives the parts by weight of curing agent (Megarads in the case of electron beam) for 100 parts of elastomer.

| | 1st Curing Agent | | | | | | |
|---|---|---|---|---|---|---|---|
| Example | Diak 1 | Diak 3 | T(VC) D-40 | Electron Beam | Cure Time (Min) | $M_{100}$ | Tear Strength (kg/cm) |
| 5 | 1.65 | — | — | — | 30 | 7.0 | 12.4 |
| 6 | — | 1.65 | — | — | 30 | 3.8 | 19.6 |
| 7 | — | — | 3.65 | — | 12.5 | 8.2 | 10.4 |

-continued

| Example | 1st Curing Agent | | | | Cure Time (Min) | $M_{100}$ | Tear Strength (kg/cm) |
|---|---|---|---|---|---|---|---|
| | Diak 1 | Diak 3 | T(VC) D-40 | Electron Beam | | | |
| 8 | — | — | — | 10 Mrads | — | 2.8 | 12.2 |

The values of $M_{100}$ obtained in Examples 5–8 may be compared with the values obtained after treatment with various second curing agents to be used after the article has been installed. The second curing agent was applied as a thin coating on the elastomeric sheet. It was applied in solution to one side only, and the solvent is given below in brackets. The elastomeric sheet was used in the form of a slab of thickness of 0.5 mm. It will be remembered that a low value of $M_{100}$ after the first cure together with a high value after the second cure is desirable.

| Ex. | 2nd Curing Agent | $M_{100}$ (Kg/cm$^2$) | | | |
|---|---|---|---|---|---|
| | | Ex. 5 | Ex. 6 | Ex. 7 | Ex. 8 |
| 9a | 50% Versamid 125 (isopropanol) | 8.0 | 6.0 | 8.2 | 4.8 |
| 10a | 49% Versanide F-20 (isopropanol) | 10.4 | 6.3 | 10.5 | 4.2 |
| 11a | 42% Capcure WR-6 (isopropanol) | 10.8 | 9.5 | 11.1 | 7.7 |
| 12a | 33% Capcure WR-6 (trichloroethane) | 12.1 | 8.0 | 11.1 | 6.2 |

Higher values, but showing similar patterns, were obtained when the second curing agent was applied to both sides of the elastomeric sheet, as shown below.

| Ex. | 2nd Curing Agent | $M_{100}$ (Kg/cm$^2$) | | | |
|---|---|---|---|---|---|
| | | Ex. 5 | Ex. 6 | Ex. 7 | Ex. 8 |
| 9b | 50% Versamid 125 (isopropanol) | 12.2 | 5.8 | 39.4 | 4.7 |
| 10b | 49% Versanide F-20 (isopropanol) | 12.5 | 8.9 | 10.5 | 4.2 |
| 11b | 42% Capcure WR-6 (isopropanol) | 20.3 | 18.5 | 19.5 | 6.7 |
| 12b | 33% Capcure WR-6 (trichloroethane) | 27.9 | 8.4 | 11.9 | 5.5 |

Examples 13–16 again use the elastomeric sheets of Examples 5–8, and also use the second curing agents of Examples 9–12, but here trouser tear strength (as referred to above) was measured. The second curing agent was applied to one side only of the article.

| Ex. | 2nd Curing Agent | Tear strength (Kg per Linear cm) | | | |
|---|---|---|---|---|---|
| | | Ex. 5 | Ex. 6 | Ex. 7 | Ex. 8 |
| 13a | 50% Versamid 125 (isopropanol) | 21.4 | 13.1 | 9.3 | 8.8 |
| 14a | 40% Versamine F-20 (isopropanol) | 24.6 | 15.6 | 9.3 | 9.3 |
| 15a | 42% Capcure WR-6 (isopropanol) | 26.1 | 14.6 | 10.0 | 9.5 |
| 16a | 33% Capure WR-6 (trichloroethane) | 20.5 | 17.5 | 9.7 | 10.8 |

As with the $M_{100}$ values, a similar pattern was observed, but with higher absolute values, when both sides of the elastomeric sheet were treated with the second curing agent, as shown below.

| Ex. | 2nd Curing Agent | Tear strength (Kg per Linear cm) | | | |
|---|---|---|---|---|---|
| | | Ex. 5 | Ex. 6 | Ex. 7 | Ex. 8 |
| 13a | 50% Versamid 125 (isopropanol) | 25.7 | 16.7 | 19.8 | 9.8 |
| 14a | 40% Versamine F-20 (isopropanol) | 15.4 | 18.7 | 11.3 | 11.8 |
| 15a | 42% Capcure WR-6 (isopropanol) | 13.8 | 14.0 | 11.8 | 10.8 |
| 16a | 33% Capure WR-6 (trichloroethane) | 20.3 | 17.6 | 9.7 | 11.8 |

It can be seen from the above Examples that best overall results were achieved with the first curing agent of Example 5, and with Versamide F-20 (isopropanol) or Capcure WR-6 (trichlorethane) as the second curing agent. Precisely which reagents are preferred will, however, depend on the application, particularly on which of a high modulus or a high tear strength is more important.

In a first set of embodiments, the article is in the form of a double-walled tube that can be revolved along an elongate member by relative sliding motion (which could be pictured as shear) between the two walls of the double wall, substantially without relative sliding motion between a wall adjacent the member and the member, the double wall preferably:

(a) defining a closed region between its two walls;

(b) having between its two walls a friction-reducing means comprising a solid or a liquid;

(c) comprising an elastomeric material, preferably having a secant modulus at 100% elongation of less than 10.6 Kg. per sq. cm. (150 psi).

If said liquid is non-setting, the volume of the closed region is preferably such that when the article surrounds a substrate of a size such that its wall adjacent the substrate is under a positive tensile strain the average separation between its walls is less than 10 times its average wall thickness.

Also, the tube preferably is of such configuration that it will buckle, preferably bellows buckle or column buckle, rather than revolve if subjected to an axial compressive force applied between an outer wall at one extreme end and an inner wall at an opposite extreme end. This in effect puts preferred limits on its relative dimensions.

By revolving we simply mean that relative sliding motion or shear between first and second walls of the double wall can be continued such that the first and second walls exchange position and can preferably then return to their original configuration. Such a complete revolution may be achievable only once, although we prefer that it can be continued as many times as desired. (A curable friction-reducing means may be provided between the walls and its curing or curing of the elastomeric material may limit the time during which revolving is possible.) Thus, the article may be revolved along an elongate member and left in any desired position. The first and second walls may of course be indistinguishable from one another, except for the fact that at any given time one is an inner wall adjacent the substrate and one is an outer wall overlying the inner wall. Then the portion of wall material that constitutes each wall will continuously change as the revolving action takes place. Revolving involves stretching a wall portion as it passes from an inner position, and relaxing another wall portion as it passes from an outer position to an inner position. When we refer to a first, second, inner or outer wall we refer merely to a portion of wall identifiable for the time being by its position and do not imply that it has any structural uniqueness. The revolving action may be pictured best perhaps by imagining a longitudinal axial section of the double-walled tube over a cylindrical substrate. The tube will appear as a caterpillar-track on either side of the substrate (Caterpillar is a trade mark). The tube can progress along the substrate by the caterpillar-tracks revolving. This involves shear between the inner and outer walls constituting the caterpillar-track, and will generally avoid shear between the inner wall and the substrate. When the article has reached the desired position, it may simply be left there as it is. Alternatively, an outer wall may be cut (which term includes any suitable technique for parting two parts of it) and a resulting separated outer wall portion revolved such that the double walled article becomes (at least in part) a single walled article extended along the substrate.

When we refer to the double-walled tube we do not preclude additional walls or layers, providing the revolving action is still able to take place.

The article of this invention may be of any length, and it will generally be less than 30 m (100 feet) and more frequently less than 15 m (50 feet). Typically articles of this invention are from about 5 cm (2 inches) to about 130 cm (50 inches) in length, and in particular are from 13 cm (5 inches) to 80 cm (30 inches) in length depending on the substrate over which they are to be used.

The outer diameter of the article similarly can be of any desired size, and typically is less than 125 cm (50 inches) generally less than 50 cm (20 inches), preferably from 2.5 cm (1 inch) to 15 cm (6 inches) depending on intended use. The inner diameter is preferably from 0.2 cm–120 cm, more preferably 0.5 cm–50 cm, especially 1 cm to 10 cm.

The ratio between the length and outer diameter of the article will also depend on the use to which it is to be put. We prefer, however, that that ratio is more than 5, more preferably more than 7, especially more than 8. Typical values are from 5–12. Articles of such shape, particularly with a low volume of friction-reducing means within the double wall, will tend to buckle (rather than revolve) if subjected to an axial compressive force applied between an outer wall at one extreme end and an inner wall at an opposite extreme end. As a result a preferred technique whereby articles of the invention are installed is as follows: the revolving action is at least initiated by applying a shear force between the inner wall at one extreme end (by means for example of an end of a substrate to be covered) and the outer wall at a position a short distance, say less than 7 cm, preferably from 0.5–5 cm, from that same end (by means for example of an installer's hand). This technique is particularly relevant to a preferred use of the article where both the inner and outer walls are under tension when the article is installed on the substrate, as is required if an environmental seal is to be reliably achieved. Both the inner and outer walls must therefore be expanded as the article is revolved onto the substrate, and that portion of the outer wall which is over the substrate will generally be under greater tension than the remainder that has yet to reach the substrate. This difference in tension will tend to drive any fluid separating the inner and outer walls towards the end of the article yet to reach the substrate, i.e. towards the end of less tension. The inner and outer walls at the end over the substrate will cease to be separated, and friction will bring the revolving action to a stop. Hence the preference for the means, to be discussed below, restricting displacement of the friction-reducing means.

The inner and outer walls are each preferably from 0.0025 to 1.3 cms (0.001 to 0.5 inches) thick, more preferably from 0.05 to 0.65 cms (0.02 to 0.25 inches), and most preferably from 0.15 to 0.25 cm (0.05 to 0.1 inch) thick. The material comprising the walls should of course be sufficiently flexible that the revolving action may take place, and it preferably has an elongation to break of at least 20%, more preferably at least 40%, especially at least 100%, more especially at least 200%, particularly at least 500%, more particularly at least 700%. These figures relate to the ASTM test D412-83.

The degree to which the walls of the article may be stretched will determine the maximum size of substrate over which the article may be installed. Preferably, the outer diameter of the substrate is from 1.0 to 8 times the inner diameter of the article of the invention. Preferred ranges are from 1.1 to 5, especially from 1.1 to 2.5.

The ease with which the article can be installed over a substrate of larger size will depend on the tensile stress of the material comprising the walls. We prefer that the article can be installed by hand over substrates having the size ranges given above, using the technique disclosed above whereby a shear force is applied between the end of the article and a position close to that end.

The material comprising the double-wall will be chosen from at least three considerations. Firstly it must allow the revolving action necessary for installation onto or use along a substrate of a certain size or shape or substrates of a certain range of sizes and shapes. The properties of interest here will include flexibility, tensile stress at a chosen elongation, elongation to break and ability to retain the friction-reducing means. The second consideration is the functional requirement of the installed product. For example, if it is required to provide environmental protection it may need a certain mechanical strength, abrasion resistance, cut resistance, moisture impermeability, etc. If it is to have an electrical function it may be required to be of high resistivity as an insulator, of low resistivity as a screen or other conductor, of intermediate resistivity as for stress-grading. It may have a certain specific impedance at a certain frequency, it may need anti-tracking properties, or it may need resistance to corrosion under high electrical discharge, etc. Where it is to be used in difficult environments it may need compatibility with certain sealing materials, U.V. resistance, fungal resistance, oxidation resistance, resistance to stress-relaxation, flame resistance, resistance to solvents, or low water up-take, etc. Such features are known to be required of certain prior art products, for example heat shrinkable sleeves, and the man skilled in the art of polymer formulation will know how to prepare suitable materials. After reading this specification he will be able to prepare various new and inventive articles that combine the ability to be installed by the revolving action described herein, and any one or more of the above functional requirements.

The third requirement is that its physical properties, such as tear-strength, surface hardness and rigidity be able to be changed after installation by, for example, curing by spraying with a curing agent. Thus, the article can be easily installed due to the elastomeric nature of its walls, and when in position it may be cured preventing or restricting further movement.

The friction-reducing means within the double wall may be restricted from displacement by its being physically attached to the inner and outer walls. For example, the walls may have a low friction coating. A second possibility is the provision of some means that deforms a second region of the article, preventing flow of friction-reducing means away from a first region where it is needed.

We prefer, however, that the friction-reducing means is a liquid having such rheological properties that it can continue to provide hydrodynamic lubrication under the conditions described herein. We prefer also that the liquid wets the surfaces of the wall of the double-walled tube, preferably at a dihedral angle of less than 80°, more preferably less than 45°, especially less than 30°. The correct rheological properties and the ability to wet the walls result, it is thought, from some sort of weak bonding network throughout the friction-reducing system to the walls that allows the walls to slide past each other in shear but resists displacement of the friction-reducing means that would otherwise occur due to the tension in the outer wall and the force of installation which effectively forces the two walls together.

Preferred behaviour of the lubrication system is reflected in such properties as the change in viscosity with shear rate. We prefer in fact that the friction-reducing means is a non-newtonian particularly highly non-newtonian liquid (which term includes semi-solid). It is preferably pseudo-plastic (viscosity decreases with increasing shear) and/or is a bingham fluid (which means that it has a certain non-zero yield stress). Preferably the viscosity at 20° C. is less than 10,000, especially less than 5,000, particularly less than 1,000 centipoise at shear rates of greater than or equal to 100, particularly greater than 500, especially greater than 1,000 reciprocal seconds. We also prefer that the viscosity at 20° C. at a shear rate of 1 reciprocal second is greater than the following, in order of ascending preference: 1, 50, 100, 200, 5,000, 10,000 centipoise.

We have discovered that in addition to preferred absolute values of viscosity the rate of decrease of viscosity with shear rate, i.e. the degree of non-newtonian behaviour, is important. We particularly prefer that, at least over a range of from 1–100 reciprocal seconds, the viscosity drops by at least a factor of 5, 10, preferably 15, especially from 15–30. This factor is not particularly temperature dependent, and we prefer that it holds at 20° C.

A further property desirably possessed by the friction-reducing system is pituity. This property is related to the cohesive strength of the liquid and can be pictured as stringiness. It may be quantified in terms of extensional viscosity.

The following liquids (which term includes compositions often referred to as gels) may be used as the friction-reducing means: a polyhydric alcohol such as glycerin or a glycol, or polyhydric alcohol-based or water based solutions containing a soluble polymer such as a polyacrylate, poly-methacrylate, polyacrylamide, polyethylene oxide, pllyamide, polyamines, guar gum, xanthum gum, alginate, maleic anhydride copolymers, polyvinyl pyrrolidone, polyvinyl alcohol, cellulose derivatives such as hydroxypropyl cellulose, carboxy methyl cellulose and hydroxy ethyl cellulose; oils, such as silicone oils, hydrocarbon oils, mineral oils and vegetable oils. Where solutions, or other combinations of a dispersed and a continuous phase, are used, dispersing, solubizing, gelling or other stabilizing agents may be used. Such agents are thought to act by making possible an extended weak hydrogen-bonded or ionic-bonded matrix throughout the liquid that can be ruptured by shear.

Preferred solutions having a high pituity comprise very dilute solutions of very high molecular weight, generally slightly gelled, polymers. Molecular weights greater than 2 million, especially greater than 4 million are preferred, and concentrations from 1 to 8%, especially 2–6%, particularly about 3% by weight are preferred. A commercially available example is an aqueous lubricant called Polywater F ® from American Polywater Corp. of Stillwater, Minn.

Thickened aqueous or non-aqueous polymeric solutions are however preferred. A first example is a solution comprising about 90% by weight propylene glycol, 0.05 to 5% preferably about 0.5% by weight slightly anionic polyacrylamide having a molecular weight greater than 6 million, and the remainder water. The primary function of the water is as a solubilizing agent for the polyacrylamide. A second example is a solution comprising 0.05 to 5% by weight polyethylene oxide in water. A third example is a solution comprising 0.05 to 5% of polyacrylamide in water. Further ingredients such as biocides, boundary lubricants or stabilizers may be added.

The intended use of the article of the invention may restrict the type of lubrication system that can be used. For example, if the article has to be installed at high temperatures or will experience high temperatures once installed, it may be desirable to use a lubrication system based on a liquid of low vapour pressure at such temperatures in order to avoid inflation or bursting of the double-walled tube. A particular instance is the use of the article over a high voltage cable, for sealing a splice or for other purposes. Whilst such cables are intended to operate at about 90° C., higher temperatures can arise and accessories used in conjunction with such cables are expected to be operable up to 130° C. Thus, we prefer that the article of the invention can function at 130° C. and in particular that the lubrication system has a vapour pressure at 130° C. that is insufficient to expand significantly the walls of the double-walled tube. Preferably therefore the lubrication means has a boiling point of greater than 130° C. under the conditions pertaining within the double-wall, and we further prefer that its vapour pressure at 130° C. is less than 1 bar.

In some instances it may be desirable that the lubrication system hardens after the article has been installed. When hardening takes place the extent of filling between the walls may be greater than where it does not since a stable and tough installed product may still be obtained. The hardening may result from chemical curing, for example of a latent curing adhesive system within the double wall. Such a curing system may comprise the lubrication system or it may be in addition to it.

A sealing material may be provided between the inner wall and the substrate or between the outer wall and some other object with respect to which movement is to be prevented. Such sealing material may be supplied on a surface of the substrate, on a wall of the article or as a discrete component that is positioned as desired during installation of the article. For example, the sealing material may be provided in sheet form (which includes tapes, strips and bands), either alone or on a backing material, which may be wrapped around the substrate.

The double-walled tube is able to apply a compressive force to a sealing material, forcing it against a substrate, whilst avoiding any shear that would tend to displace it during installation.

Sealing materials that may be used with the article for sealing or locking purposes include adhesives, sealants, gels and cement, mortar or concrete, etc. The sealing material may be in any suitable form, but it is preferably solid or semi-solid, especially in tape or block form.

Preferred sealants include mastics, oils and greases such as those disclosed in U.S. Pat. No. 3,297,819 to Wetmore, which comprise substantially non-crystalline materials generally having a viscosity of not more than $10^{13}$ centipoise at 25° C. Such a material may flow under the compressive force provided by the article of the invention to fill any voids or other leak paths to the underlying substrate.

A third, and preferred, category of sealing materials that may be used with the article is a gel, by which we mean a material preferably having a cone penetration of from 50 to 500 ($10^{-1}$ mm) and an ultimate elongation of at least 100%. Cone penetration values are as determined by a method based on ASTM D217-68 at 21° C. (70° F.)±3° C. on an undisturbed sample using a standard 1:1 scale cone (cone weight 102.5 g and shaft weight 47.5 g), the penetration being measured after 5 seconds. The ultimate elongation values are as determined by a method based on ASTM D638-80 at 21° C. (70° F.)±3° C. at a speed of 50 cm per minute. Preferably the cone penetration is from 100-350 ($10^{-1}$ mm), more preferably from 150-350 ($10^{-1}$ mm). We prefer that the ultimate elongation is at least 200%, more preferably at least 500%. Furthermore, we prefer that the gel has an elastic modulus of less than $10^8$ dynes/cm$^2$, more preferably less than $10^7$ dynes/cm$^2$, particularly less than $10^6$ dynes/cm$^2$, more particularly less than $10^5$ dynes/cm$^2$. These figures are as measured at 21° C. (70° F.)±3° C. using a parallel plate rheometric test at a frequency of 1 Hz.

Where high temperature performance is required, for example in connection with high voltage cables, a material of the following type may be preferred. This material is referred to herein as a gelloid composition since, although it will in general have the appearance associated with the gels referred to above, it may have (although it preferably does not) cone penetration values or elongation values outside the above ranges, and may have a low gel fraction such as less than 15%. Gelloid compositions may comprise: a cross-linked non-silicone polymer having an olefinic unsaturated content of less than 10 mole per cent and having 0.1-3 cross-links per weight average molecule; a liquid dispersed in the polymer in an amount of from 20-95% based on the weight of the dispersed liquid and the polymer; and a filler dispersed in the polymer and/or liquid at a volume fraction V of from 0-0.3 based on the polymer, liquid and filler; the composition preferably having a storage modulus of $(1 + 2.5 v + 14.1 v^2)X$ dynes/cm$^2$ where X is less than $5 \times 10^5$ at 30° C. and greater than $5 \times 10^3$ at 90° C.; the composition preferably having a dynamic viscosity of $(1 + 2.5 v + 14.1 v^2)Y$ poise where Y is less than $1 \times 10^5$ at 30° C. and greater than $3 \times 10^3$ at 90° C.; and the composition preferably exhibiting first degree blocking.

Where a degree of electrical conductivity is required, for example for stress-grading, a gel may be used that has a DC resistivity of from $10^7$ to $10^{11}$, preferably from $10^{10}$ to $10^{11}$ ohm cm. and a specific impedance of from $10^7$ to $10^{10}$ ohm cm. at 60 Hz.

In a second set of embodiments, the invention provides an elastomeric sheet together with a hold-out member by means of which the sheet is maintained in a stretched configuration. Preferably the sheet has a tubular configuration, and the hold-out member also has a tubular configuration and is positioned within the tubular sheet thereby maintaining the stretched configuration of the sheet. The hold-out member may, for example, have a line of weakness such that it can be deformed and peeled away from the sheet. It may comprise a spiral within the tubular sheet, an end of which spiral is accessible and can be pulled to remove the spiral from within the sheet. In that embodiment it is preferred that the end of the spiral that is pulled, is pulled in a direction towards the other end of the spiral, and it may have an extension such that this can be done from outside the tubular sheet. This arrangement is preferred because the sheet as it progressively collapses on progressive removal of the spiral will not trap the deforming spiral and prevent further removal.

A hold-out member may alternatively have a tubular configuration with the sheet, also of tubular configuration being bonded to an internal surface and thereby being maintained in a stretched configuration. The bond can be destroyed, for example chemically or by mechanically initiating failure which can then propagate by peel, to allow the sheet to relax.

After the hold-out member has been removed, curing of the elastomeric sheet may be effected, for example by spraying with a suitable curing agent such as a thiourea.

In a third set of embodiments the invention provides a curable elastomeric tape. In general, the tape will be wrapped around a substrate and stretched as it is wrapped. It may then be secured at its ends to prevent unwrapping, and caused to cure preferably by spraying with a suitable curing agent such as a thiourea.

We will now describe in general terms some preferred instances of use of a double-walled article comprising the curable elastomeric material. In each case a sealing material may be applied to the substrate and/or to the article and an article comprising a double wall then revolved over the substrate, and, when in a suitable position, subjected to curing or hardening operation, for example by spraying with a curing agent.

In a first embodiment, the article is used over a low voltage cable (including power and telecommunications cables), say less than 1 kV, or over an optical fibre cable, to provide environmental protection or electrical insulation to a splice in the cable or to act as a repair to a damaged portion of the cable jacket. The double-walled tube preferably comprises an insulating material of resistivity greater than $10^{10}$ ohm.cm especially greater than $10^{12}$ ohm.cm, which preferably has an ultimate elongation of at least 150%, more preferably at least 200%, most preferably at least 500%, especially at least 900%. The material preferably has a dielectric constant of from 2 to 6. Water absorption into the material should be low, preferably less than 2% especially less than 1% by weight. The material and any friction-reducing means should be stable at temperature at least up to 90° C. for long periods of time. Tension set should be low. The material preferably has U.V. stability, as may be achieved by the addition of carbon black, especially when the article is for outdoor use. The article may be used in conjunction with a sealing material as mentioned above. Other uses for such an article include bus bars, bushings, fuses, elbow connectors and various other electrical connections, electrical wires, pipes and pipe lines, including hose and irrigation pipes, particularly over weld areas and damaged sections, pylons of off-shore oil rigs, flag poles, and other articles of circular or other cross-sectional shapes. The article may be used with additional means such as a casing for example an outer tube or half-shells for further mechanical protection. Preferably, the article itself or the article with the additional means (after curinq) will pass an impact test substantially undamaged that consists in dropping vertically onto the article a 5 cm diameter steel ball from a height of 40 cms, preferably 60 cms, more preferably 90 cms.

Where a cable comprises more than one conductor, for example the three conductors of a three-phase power supply, more than one double-walled tube may be used.

In a second embodiment, the article may be used over a high voltage cable (splice or termination) or other conductor, generally greater than 1 kV, especially greater than 5 kV, often greater than 11 kV. Hence the article may provide, or be used in conjunction with, one or more other materials that provide, at least one or more of the following: a stress-grading layer adjacent the conductor and the cable shield, and intermediate insulating layer, and an outer conductive layer providing shield continuity.

In a third embodiment cable protection, such as splice covering, cable jacket repair and termination, is provided in a dangerous or rough environment such as a mine. Here the double-walled tube preferably comprises a flame-retarded, material, and curing preferably imparts a high degree of abrasion-resistance and tear and split resistance. After curing, tear resistance, as measured by ASTM D624, Die C is preferably at least 90 N per cm (40 lb. per linear inch) especially 150 N per cm. The tube is preferably used with a sealing material such as a gel or a mastic that does not require heat for installation. Hardening of the material or curing may prevent revolving due for example to the cable being dragged along the ground, but in some circumstance it may be preferred before curing to cut at least the outer wall and roll it back down onto the substrate. If the cut is made near one end of the article, both walls may be cut through since only a small length of the article will be lost.

In a fourth embodiment environmental protection is provided over a telecommunications cable splice. Such cables may contain up to, say, 2400 pairs of conductors, and splices can be considerably larger in diameter than the cables themselves due to the large number of crimp or other connectors required. The double-walled tube may be installed with ease over such a transition and can accommodate the changes in size, which it must do if it is to extend from the intact cable jacket of one cable across the splice region to the intact cable jacket of the other cable. It may be desirable to use the double-walled tube in conjunction with a liner which may be positioned over the splice and over which the tube is revolved. The liner may serve to provide mechanical strength, for example axial pull strength across the splice and impact strength, and especially if it has a metal component it may act as a moisture vapour barrier.

It is often desirable to provide an environmental seal around a branched cable splice. Examples include branched telecommunication cables splices, or low voltage power branch joints, for example for street lighting. A seal can be made using the present invention by revolving a double-walled tube to a position overlying the splice such that it spans the region to be sealed.

A sealing material may be provided in the crutch region between the branching cables, preferably a sealing material that is sufficiently soft that it can be deformed by the double-walled tube as it is revolved into position. Preferred sealing materials comprise mastics, curable adhesives and gels as described above. It may be noted that the revolving action puts the sealing material under compression but does not tend to displace it longitudinally. The tube may therefore be advanced so that the sealing material is completely covered.

Any of the above seals may be enhanced by the use of means which bring towards one another the inner and outer (or just the inner) walls between the branching cables. A branch-off clip, such as that disclosed in Great Britain No. 2,019,120 may be used. Where a three legged clip is used, the centre leg may comprise a sealing material as mentioned above.

As will be apparent, this invention is extremely versatile. Situations where a curable elastomeric material may be used, particularly in the form of a double-walled tube can be substituted for a prior art material can be found in the following, the disclosures of which are incorporated herein by reference: U.S. Pat. Nos. 3,610,291 to Heslop, 3,950,604 to Penneck, 4,118,260 to Boettcher, 4,142,592 to Brusselmann, 4,194,082 to Campbell, 4,350,842 to Nolf, 4,400,579 to Nolf, 4,409,426 to Nolf, 4,426,413 to Fentress, 4,431,861 to Clabburn et al., 4,466,843 to Shimirak, 4,467,137 to Paget et al., 4,485,269 to Steinberg, 4,478,486 to Fentress, 4,498,732 to Fentress, 4,499,129 to Kridl, 4,511,611 to Moisson and 4,518,819 to Larsson et al., and Great Britain 2,110,479 to Link et al., and 2,125,637 to Clabburn et al., and EP Nos. 0,210,807, 0,212,851, 0,209,399 and 0,210,061 (Raychem Corporation).

This invention is further illustrated with reference to the accompanying drawings, in which:

FIG. 1a is a perspective view of a first embodiment of the invention comprising a double-walled article;

FIG. 1b is a transverse cross-sectional view of the article;

FIG. 1c is an axial cross-sectional view of the article;

FIG. 2 illustrates a preferred method of forming the article;

FIG. 3a illustrates an initial revolving action;

FIG. 3b illustrates subsequent revolving action;

FIG. 3c illustrates the installed article;

FIG. 4 illustrates an axial cross-section of a low voltage cable joint enclosed by an article of the invention;

FIGS. 5a-b illustrate the use of an article of this invention as a protective cover over an end of an elongate substrate;

FIG. 6 illustrates the use of an article of this invention together with a sealing material to protect a cable breakout;

FIG. 7 illustrates a joint between high-voltage cables protected by a conductive and insulating article of this invention;

FIG. 8 shows an article of this invention further comprising sheds for application to a high voltage termination;

FIG. 9 illustrates the use of an article of this invention as a duct seal;

FIG. 10 illustrates the use of the present invention for joining together two pipes;

FIG. 11 illustrates the double-walled tube as part of a larger device;

FIGS. 12a and 12b show an article of this invention being used to install an object onto a substrate; and FIGS. 13 and 14 show a second embodiment of the invention in the form of tubes with hold-out members.

In each of the applications illustrated, a sealing material may be applied to the substrate and/or to the article and the article then revolved over the substrate. The figures illustrate the various articles and substrates, but in some instances a sealing material has been omitted for clarity.

A typical article is illustrated in FIGS. 1a, 1b and 1c which provide respectively perspective, transverse cross-sectional and longitudinal cross-sectional views. The article 1 comprises an outer wall 2 and an inner wall 3. The walls are joined to form a continuous, closed double-walled tubular structure. A friction-reducing means 4 is located within the double wall, separating the walls and allowing relative sliding motion between them.

An article of this invention, generally tubular in shape, can be made by a variety of methods. The manner in which it is made is generally not critical. A preferred method of manufacture is illustrated in FIG. 2. In this method, a tube 5 approximately double the desired length of the tubular article is formed by, for example, extrusion. The ends 6 and 7 of the tube 5 are folded over until they form an overlap region as illustrated. Solid, liquid or semi-solid friction reducing means can be added at this point. The ends 6 and 7 may be secured together, for example by means of an adhesive, forming the continuous wall of the double-wall structure.

Another preferred method comprises extruding individual tubes, one of smaller diameter than the other, arranging the tubes in concentric relationship and then bonding the ends of the tubes together.

To apply the double-walled tubular article 1 to a substrate 8, an end 9 of the article is expanded to the outer diameter of the substrate and an end of the substrate is inserted into the expanded open end 9 of the article, as shown in FIGS. 3a and 3b. The force on the article will generally be applied at line 10, i.e. close to the end 9 of the substrate, since the article may buckle if it were applied at position 11. From FIG. 3b it can be seen that, for the relative size of substrate and article illustrated, the circumferential tension in the right hand end 9 of the outer wall 2 will be greater than in the left hand end which would cause the friction reducing means 4 to be driven away from where it is needed, were it not for some means to restrict such displacement.

Continued axial force causes the tubular article to move axially along the substrate as shown in FIG. 3c until the desired position is reached. Then, the article is cured to harden its surface, or to impart rigidity thus restricting its further movement. Thus, the article can be used to cover, for example a cable joint. Before the cables are joined, the tubular article is positioned over one of the cables and axially revolved away from the cable end. The cables are then joined and the tubular article is positioned over the joint by applying an opposite axial force relative to the outer wall.

FIG. 3c illustrates, partially in cross-section, article 1 when fully on an elongate substrate. Article 1 comprises outer wall 2, inner wall 3 and friction reducing means 4. In FIG. 3c the arrows indicate movement of the outer wall 2 while substrate 8 substantially prevents axial motion of inner wall 3. As a result outer wall 2 progressively revolves into contact with the surface of substrate 8 resulting in moving the article 1 in an axial direction from left to right in the drawing.

FIG. 4 illustrates the use of the article to cover a low voltage (i.e. below about 1000 volts) cable joint. As illustrated, the outer layers 13 of insulation and protection of the cables 14 have been removed to expose bare conductors 15. These conductors are connected by connector 16. Sealing material 7 in the form of a tape is applied around each cable insulation 13. The sealing material may comprise an elastomer-based composition such as that disclosed in U.S. Pat. No. 4,497,926 to Toy or a sealant tape such as that disclosed in GB No. 2,123,026 or EP No. 174,165. Article 1 has been positioned over the joint. Article 1 may comprise for example a continuous double-walled structure of neoprene 1.5 mm (60 mil) thick with a silicone oil 4 within the double-wall, or an EPDM rubber of wall thickness about 90 mm and a friction-reducing means comprising propylene glycol and polyacrylamide. Article 1 provides insulation for the conductive elements as well as mechanical protection, and together with sealing material 17 environmentally seals the joint.

FIGS. 5a and 5b show a double-walled article 1 as an end cap used to enclose an end of an elongate substrate 8, such as a cable. An alternative is illustrated in FIGS. 6a and 6b where the article 1 is used to hold a truncated cone 18 or other end block against an end of a cable or other substrate 8, the seal being enhanced by sealing material 17. FIG. 5a shows the situation before installation, and FIG. 5b after.

In FIG. 6, cable 14 has been broken out into cores 23. To protect the cable from ingress of water, pollutants in the environment, dirt, etc., at the cable breakout, a profile 24 of sealant or other sealing material is positioned at the breakout.

In FIG. 7 are shown two 5 kV electric cables 14 with their outer jackets removed to expose shields 25, insulation and conductors 15, joined by conducting crimp or other connector 16. A void filling sealing material 26, preferably one that is stress grading, e.g. a polyepihalohydrin-based composition such as that disclosed in U.S. Pat. No. 4,378,463 to Senior et al. is placed over the conductors and insulation. An insulating article, 27, is positioned across the joint. The separation or friction-reducing means between the double-wall of article 27 is a relatively void-free material having suitable dielectric properties to insulate the joint. On top of insulating article 27 a further, but conductive, article 28 has been installed. The conductive article is shown connected to the cable shields by means such as leads 29.

High voltage sheds may, if desired, be applied using this invention. In FIG. 8 an article 1 of this invention has outwardly projecting sheds 32 toward one end thereof. As the article is applied to the termination the sheds are carried, along with the wall to which they are attached, to their desired position.

FIG. 9 shows the provision of a duct seal 33 by means of the invention. What follows applies also to the provision of what is known in the cables accessories and other arts as a feedthrough; the articles have similar functions and they differ primarily in the greater length of a feedthrough. An annular space between a cable 14 or other supply line etc. and a bulkhead or duct etc. 34 is to be sealed to prevent the transfer through it of moisture or other contaminant or heat etc. An article 33 comprising two mutually substantially concentric double-walled tubes 35 and 36 is positioned around the cable 14. The two tubes are then caused to revolve as indicated by the arrows. This may be achieved by inserting into the right hand side of article 1 as drawn or withdrawing from the left hand side) some means 37 that engages the outer wall 38 of the tube 35 and the inner wall 39 of tube 36. It can be seen that the article 33 can advance to the left as drawn without shear between either it and the cable 14 or between it and the bulkhead 34. Curing of one or both of the tubes 35 and 37 and/or the lubricant may allow a pressure difference across the bulkhead to be resisted.

FIG. 10 shows the use of the invention in joining together mechanically two elongate substrates, such as fluid supply lines, for example pipes 22.

In FIG. 11, a double-walled article 1 is used as part of a larger device, for example as an outlet 47 of a CATV splitter box 48. At the left hand side of the drawing a double-walled article 1 is shown in position, for example mechanically fixed or bonded to the outside of an outlet of the splitter box 48. At the right hand side the article is fixed to the inside of an outlet. The cable 49 is shown before insertion.

FIGS. 12a and 12b show the use of the invention in delivering high-voltage sheds 32 onto a cable 14.

The shed 32 is preferably of an elastomeric material and has a center hole slightly smaller in diameter than the diameter of the cable 14. The shed comprises a central, generally axially oriented, tubular base and a radially extending flange. Application of an axial force to the article 1 in the direction shown by arrow 58 carries the shed 32 onto the cable 14. As shown in FIG. 12, the axially extending base is carried by the article 1 into contact with the cable 14, and is inverted so that it is on the opposite side of the radially extending flange. The final assembly can be left as shown in FIG. 12 with the shed on the article.

FIG. 13 show a curable elastomeric sheet 60 in tubular form, held in an expanded configuration by an external hold-out member 61 to which it is bonded. The two tubes are positioned around a cable 62 and then the bond between them is caused to fail, for example by peeling away part of hold-out member as shown at 63. The tube 60 should then peel away from tube 61. The tube 60 thus shrinks into engagement with the cable 62. Then, the tube 60 is cured, for example by spraying to provide it with the properties, such as surface hardness etc. required for service.

FIG. 14 shows a curable elastomeric sheet 60 in tubular form, held in an expanded state by an internal hold-out member 64 in the form of a spiral. The sheet 60 plus hold-out is positioned over a cable and hold-out 64 pulled in the direction of the arrow. The spiral is progressively removed from the right-hand side as drawn, causing tube 60 progressively to collapse on the cable. Then, it may be cured.

I claim:

1. An article for environmentally protecting a substrate, which comprises an elastomeric tubular article and a hold-out member by means of which said elastomeric article is maintained in a stretched configuration, said elastomeric article:
   (a) having when relaxed an elongation at break of at least 5%,
   (b) having a tear strength of at least 3 Kg per linear cm,
   (c) having a modulus of $M_{100}$ of 1.4–17.6 Kg per sq. cm, and
   (d) comprising a curable elastomeric composition which has been partially cured and which comprises an elastomeric composition and a curable component dispersed therein,
   the article being capable of being positioned around the substrate while maintained in a stretched configuration, such that while maintained in a stretched configuration, such that when released from the hold-out member the elastomeric article engages the substrate, the elastomeric article after further curing of the composition:
   (a) having a tear strength of at least 5 Kg per linear cm, and
   (b) having a modulus, $M_{100}$ of at least 3.5 Kg per sq. cm.

2. An article according to claim 1, in which the composition comprises an elastomer plasticized with a curable plasticizer.

3. An article according to claim 2, in which the elastomer and the plasticizer are co-curable.

4. An article according to claim 1, in which the composition comprises a polychloroprene rubber and an epoxy resin, the epoxy resin being present in sufficient quantity that it acts as a plasticizer.

5. An article according to claim 1, in which said hold-out member;
   (a) has a tubular configuration; and
   (b) is positioned within the tubular elastomeric article thereby maintaining the stretched configuration of the article.

6. An article according to claim 5, in which the hold-out member has a line of weakness such that it can be deformed and peeled away from the elastomeric article.

7. An article for environmentally protecting a substrate, which comprises a double-walled tube that can be revolved along the substrate by relative sliding motion between the two walls of the double wall, substantially without relative sliding motion between a wall adjacent the substrate and the substrate, at least part of the double-wall:
   (a) having when relaxed an elongation at break of at least 5%,
   (b) having a tear strength of at least 3 Kg per linear cm,
   (c) having a modulus of $M_{100}$ of 1.4–17.6 Kg per sq. cm, and
   (d) comprising a curable elastomeric composition which has been at least partially cured and which comprises an elastomeric composition and a curable component dispersed therein,
   said at least part of said double wall, after further curing of the composition:
   (a) having a tear strength of at least 5 Kg per linear cm, and
   (b) having a modulus, $M_{100}$ of at least 3.5 Kg per sq. cm.

8. An article according to claim 7, in which the composition comprises an elastomer plasticized with a curable plasticizer.

9. An article according to claim 8, in which the elastomer and the plasticizer are co-curable.

10. An article according to claim 7, in which the composition comprises a polychloroprene rubber and an epoxy resin, the epoxy resin being present in sufficient quantity that it acts as a plasticizer.

11. An article according to claim 7, in which a friction-reducing means is provided between the walls of the double wall.

12. A method of environmentally protecting a substrate, which comprises:
(i) providing an article comprising a sheet, the sheet
  (a) having when relaxed an elongation at break of at least 5%,
  (b) having a tear strength of at least 3 Kg per linear cm, and
  (c) having a modulus of $M_{100}$ of 1.4–17.6 Kg per sq. cm,
  (d) comprising a curable elastomeric composition which has been partially cured and which comprises an elastomeric component and a curable component dispersed therein;
(ii) stretching the sheet by applying a force thereto;
(iii) positioning the article such that is surrounds the substrate;
(iv) removing the force applied to the sheet in step (ii), thereby causing or allowing the sheet to relax, and thus to engage the substrate; and
(v) causing the composition to cure after step (iv), such that the sheet then has
  (a) a tear strength of at least 5 Kg per linear cm, and
  (b) a modulus $M_{100}$ of at least 3.5 Kg per sq. cm.

13. A method according to claim 12, in which the composition comprises an elastomer plasticized with a curable plasticizer.

14. A method according to claim 12, in which the sheet has the configuration of a tape; steps (ii) and (iii) comprising wrapping the tape around the substrate, stretching it as it is wrapped, and then securing the tape in a wrapped configuration around the substrate.

15. A method according to claim 12, in which the step (v) results at least in part from the application of a chemical curing agent to a surface of the sheet.

16. A method according to claim 15, in which the curing agent is applied to a surface of the sheet that engages the substrate, the curing agent rendering the surface tacky such that step (iv) results in a bond between the substrate and the sheet.

17. A method according to claim 12, in which step (v) results at least in part from the application of a chemical curing agent to a surface of the substrate and from contact between thus applied curing agent and the sheet.

18. A method according to claim 12, in which the substrate comprises a cable.

19. A method of environmentally protecting a substrate, which comprises:
(i) providing an article comprising an elastomeric tubular article and a hold-out member by means of which said elastomeric article is maintained in a stretched configuration, said elastomeric article:
  (a) having when relaxed an elongation at break of at least 5%,
  (b) having a tear strength of at least 3 Kg per linear cm, and
  (c) having a modulus of $M_{100}$ of 1.4–17.6 Kg per sq. cm,
  (d) comprising a curable elastomeric composition which has been at least partially cured and which comprises an elastomeric component and a curable component dispersed therein;
(ii) positioning said article around the substrate to be protected;
(iii) releasing the elastomeric tubular article from said hold-out member thereby causing or allowing the elastomeric article to relax, and thus to engage the substrate; and
(iv) causing the composition to cure after step (iii), such that the sheet then has
  (a) a tear strength of at least 5 Kg per linear cm, and
  (b) a modulus $M_{100}$ of at least 3.5 Kg per sq. cm.

20. A method according to claim 19, in which the composition comprises an elastomer plasticized with a curable plasticizer.

21. A method according to claim 19, in which said hold-out member;
  (a) has a tubular configuration; and
  (b) is positioned within the elastomeric tubular article thereby maintaining the stretched configuration of said article;
and step (iv) comprises removing the hold-out member from within the elastomeric article.

22. A method according to claim 21, in which step (iv) is carried out by deforming the hold-out member and peeling it away from the elastomeric article.

23. A method according to claim 19, in which said hold-out member has a tubular configuration, the tubular elastomeric article being bonded to an internal surface of the hold-out member and thereby being maintained in the stretched configuration.

24. A method according to claim 19, in which step (v) results at least in part from the application of a chemical curing agent to a surface of the article.

25. A method according to claim 24, in which the curing agent is applied to a surface of the article that engages the substrate, the curing agent rendering the surface tacky such that step (iv) results in a bond between the substrate and the article.

26. A method according to claim 19, in which step (v) results at least in part from the application of a chemical curing agent to a surface of the substrate and from contact between thus applied curing agent and the article.

27. A method according to claim 19, in which the substrate comprises a cable.

28. A method of environmentally protecting a substrate, which comprises:
(i) providing an article comprising a double-wall tube that can be revolved along the substrate by relative sliding motion between the two walls of the double wall, substantially without relative sliding motion between a wall adjacent the substrate and the substrate, at least part of the double-wall:
  (a) having when relaxed an elongation at break of at least 5%,
  (b) having a tear strength of at least 3 Kg per linear cm,
  (c) having a modulus of $M_{100}$ of 1.4–17.6 Kg per sq. cm,
  (d) comprising a curable elastomeric composition which has been at least partially cured and which comprises an elastomeric component and a curable component dispersed therein;
(ii) applying the article over the substrate;
(iii) revolving the article onto the substrate;
(iv) allowing the article to relax; and
(v) causing the composition to cure after step (iv), such that the said part of the double wall then has
  (a) a tear strength of at least 5 Kg per linear cm, and
  (b) a modulus $M_{100}$ of at least 3.5 Kg per sq. cm.

29. A method according to claim 28, in which the composition comprises an elastomer plasticized with a curable plasticizer.

30. A method according to claim 28, which additionally comprises cutting circumferentially an outer wall portion of the double wall and revolving a resulting separated outer wall portion along the substrate.

31. A method according to claim 28, in which step (v) results at least in part from application of a chemical curing agent to an outer wall portion of the double wall, after which application the double-walled tube is revolved such that said portion becomes an inner wall portion and engages the substrate.

32. A method according to claim 28, in which the substrate comprises a cable.

* * * * *